United States Patent [19]

Davis, Jr.

[11] Patent Number: 5,644,903

[45] Date of Patent: Jul. 8, 1997

[54] STEERING CONTROL FOR ZERO TURN RADIUS MOWER

[76] Inventor: Robert D. Davis, Jr., 627 Andrew Ave., Jackson, Mich. 49202

[21] Appl. No.: 521,320

[22] Filed: Aug. 30, 1995

[51] Int. Cl.[6] .......................... A01D 69/00; B62D 11/04
[52] U.S. Cl. ...................... 56/10.8; 56/11.2; 180/6.48; 180/19.3
[58] Field of Search ...................... 56/10.5, 10.8, 56/10.9, 11.1, 11.2, 11.3, 11.5, 11.6, 11.4, 11.8, 11.9, DIG. 22; 74/501.6, 502.6; 180/19.1, 19.3, 6.48

[56] References Cited

U.S. PATENT DOCUMENTS

| | | | |
|---|---|---|---|
| 4,470,243 | 9/1984 | Royfield | 56/11.2 |
| 4,721,494 | 1/1988 | Hayashi et al. | 56/11.3 X |
| 4,914,592 | 4/1990 | Callahan et al. | 180/6.43 X |
| 5,020,308 | 6/1991 | Brown et al. | 56/11.3 |
| 5,062,755 | 11/1991 | Lawrence et al. | 414/4 |
| 5,131,483 | 7/1992 | Parkes | 180/6.48 |
| 5,239,810 | 8/1993 | Gugel | 56/10.8 |
| 5,279,376 | 1/1994 | Yang et al. | 180/6.48 |

Primary Examiner—Terry Lee Melius
Assistant Examiner—Robert Pezzuto
Attorney, Agent, or Firm—James M. Deimen

[57] ABSTRACT

A single lever handle control mechanism constrained to pivot about two perpendicular axes to control forward, reverse, speed and steering of the mower. By this constraint to the movement of the lever handle, inadvertent movement of the lever handle is less likely to occur when the mower is bouncing over uneven terrain. Forward or backward movement of the lever handle is constrained about a single transverse axis. Right or left movement of the lever handle about the longitudinal axis effects steering of the mower. The longitudinal axis is constrained to move in a single plane perpendicular to the transverse axis. As an option a second lever handle, constrained as the first lever handle and linked to the first lever handle may be provided for control from a second location. With a lever handle on each side of the operator the mower can be fully controlled with either hand. The lever handle control is most advantageously applied to a zero turn radius riding lawn mower.

17 Claims, 3 Drawing Sheets

5,644,903

STEERING CONTROL FOR ZERO TURN RADIUS MOWER

BACKGROUND OF THE INVENTION

The field of the invention pertains to commercial size riding lawnmowers, and, in particular, to lawnmowers that have a zero turn radius and lever steering control for the operator. Such mowers will spin about a vertical axis equidistant between drive wheels when the drive wheels are driven in opposite directions with the same rotational speed.

Zero turn radius mowers are often constructed with the drive wheels approximately equidistant from the front and rear of the mower and a large caster wheel adjacent the back of the mower. Examples of such zero turn radius mowers are disclosed in applicant's previous U.S. Pat. Nos. 4,395,865 and 4,429,515 and these patents are incorporated herein by reference.

Zero turn radius mowers such as applicant's above are traditionally controlled for forward, reverse and steering by a pair of lever arms mounted on transverse pivots. The lever arms are to either side of the operator and therefore require the operator to use both hands on the levers to operate the mower.

Single lever "joy sticks" have also been used to control zero turn radius mowers. Joy stick control offers a full range of speed and steering control with one hand, however, full range control with a joy stick results in "hunting" for the right combination of speed and turn to reach a specific goal. Tracking the mower straight at high mowing speeds is important to doing a professional mowing job and, with the dual lever or joy stick control, bouncing over the terrain causes untoward motion of the levers and erratic steering control.

SUMMARY OF THE INVENTION

The invention comprises a constrained single lever mechanism to control both drive wheels of the zero turn radius mower. The lever handle is constrained to move about two, preferably perpendicular, axes to control forward, backward and steering of the mower. By this constraint to the movement of the lever handle, inadvertent movement of the lever handle is likely to occur when the mower is bouncing over uneven terrain. Thus, forward or backward movement of the lever handle is constrained about a single transverse axis. The second longitudinal axis is constrained to move in a single plane perpendicular to the transverse axis. When the lever handle is moved right or left about the longitudinal axis steering of the mower occurs.

As an option a second lever handle, constrained as the first lever handle and linked to the first lever handle may be provided for control from a second location. Thus, with a lever handle on each side of the operator the mower can be fully controlled with either hand.

The invention is most appropriately applied to zero turn radius mowers having two variable volume, reversible hydraulic pumps. Each pump individually supplies oil flow to a wheel motor which in turn is attached to a drive wheel to either side of the operator who generally sits in the center of the machine. The drive wheels are on the same geometric axis and a castor wheel is located toward the rear of the machine. Motion of the mower is regulated by the relative motion of the drive wheels. Equal forward or reverse motion of both wheels provides forward or reverse motion of the mower. When one wheel moves relative to the other wheel by reducing pump flow to one wheel relative to the other, the mower turns. When both pump flows are equal but drive the wheels in opposite directions, then the mower "zero turns" or spins in place. Such a mower, as described in applicant's above noted patents has superior maneuverability to non-zero turn mowers.

The lever mechanisms control the pump flows in a user friendly manner. Forward or reverse pivoting of the lever handle creates equal pull on the control rods or cables and causes straight forward or reverse motion of the mower. Left or right pivoting of the lever handle causes opposite travel of the control rods or cables and results in turning movement when the lever handle is also pivoted in forward or reverse. A zero turn results when the lever handle is pivoted right or left from neutral. The lever mechanism is preferably set for neutral when the lever handle is vertical. This vertical lever handle position can be a detent or "spring-to-center" position. The spring-to-center option permits the lever handle to operate as a "deadman's throttle" causing the mower to come to a stop in the event the operator is accidently thrown from the mower.

Thus, a single-hand lever control that is properly constrained to prevent untoward movements and hunting over rough terrain as disclosed below is superior to two-handed lever control or an all quadrant points unconstrained joy stick control.

DESCRIPTION OF THE PREFERRED EMBODIMENTS

Figure 1:
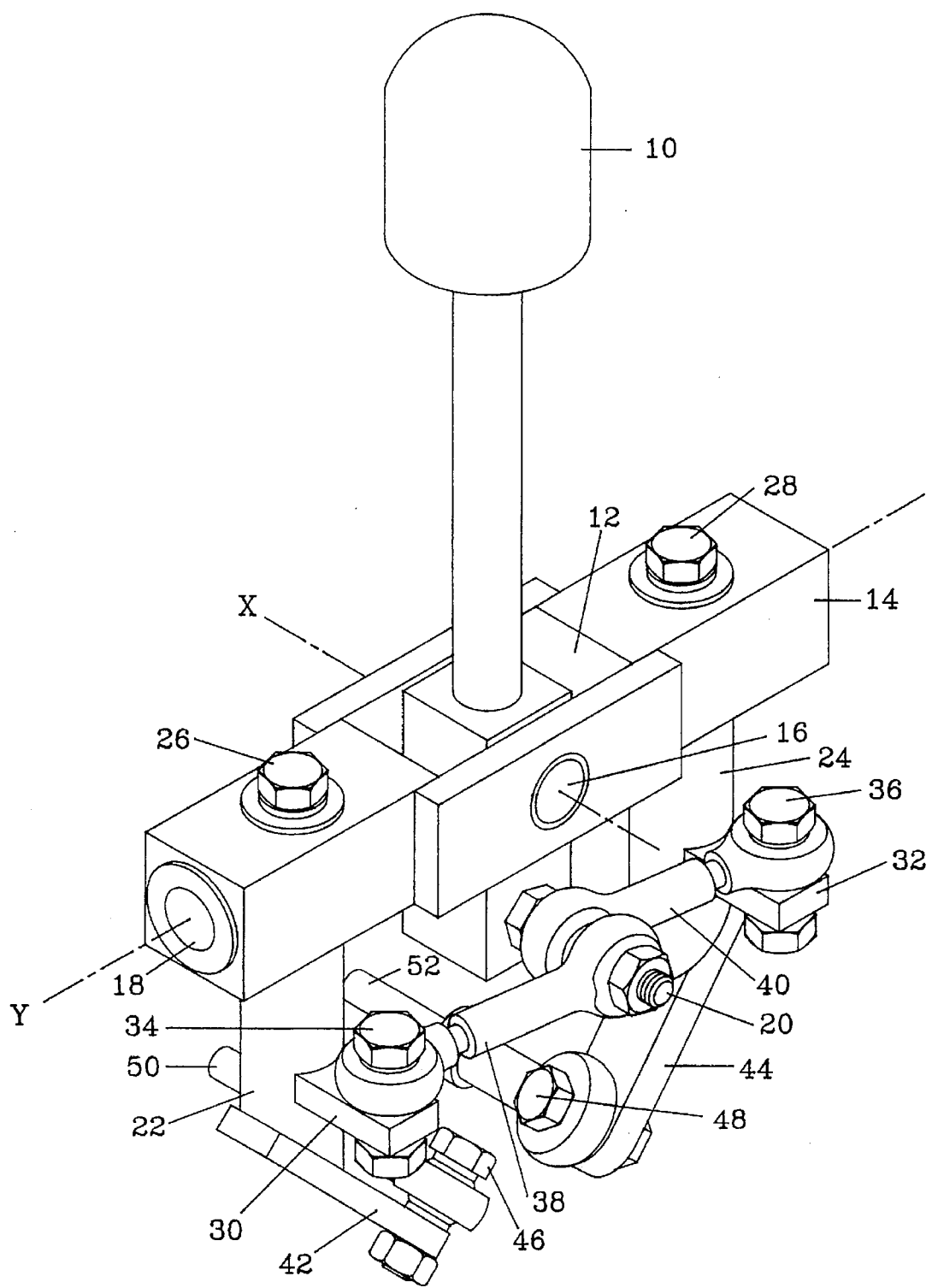
FIG. 1 illustrates in perspective a single lever handle constrained mower control.

In FIG. 1 a single lever handle 10 extends generally vertically upward through an aperture 12 in a pivot box 14. The lever handle 10 is mounted on bearings 16 in the pivot box 14 for rotation about the x-axis relative to the pivot box. The pivot box 14 is, in turn, mounted on bearings 18 for rotation about the transverse y-axis relative to the frame of the mower (not shown).

Since the bearings 18 are mounted to the frame (not shown) at a location that places the upper end of the lever handle 10 convenient to one hand of the operator, movement of the lever handle about the y-axis can be forward and backward for forward and backward motion of the mower. Movement of the lever handle 10 about the x-axis therefore controls steering to the right or left by the operator. The operator of the mower can thereby effect complete forward, reverse and steering control of the mower with a lever handle 10 constrained to move only about two perpendicular axes x and y.

The linkage to control the variable volume hydraulic pumps is located below the pivot box 14. The lever handle 10 extends below the pivot box 14 to support a pivot axis in the form of a stud 20 extending parallel to the x-axis. Depending downward from the pivot box 14 to either side of the lever handle 10 are a pair of rotatable columns 22 and 24. The columns 22 and 24 are rotatable about a pair of rotation bolts 26 and 28 respectively to provide rotation about a pair of axes perpendicular to the y-axis.

Extending from each column 22 and 24 respectively are a first pair of plates 30 and 32 rigidly attached to the columns. Attached to the pair of plates 30 and 32 respectively are a second pair of pivot bolts 34 and 36 providing attachment for a pair of links 38 and 40 rotatable thereon respectively. The pivot bolts 34 and 36 provide for rotation of the links 38 and 40 about axes parallel to the axes of the column rotation bolts 26 and 28. The links 38 and 40 at their other ends are rotatably attached to the stud 20. Thus, movement of the lever handle 10 about the x-axis effects rotation of both columns 22 and 24 simultaneously in the same rotational direction.

Depending angularly downwardly and toward each other are a second pair of plates 42 and 44 respectively rigidly attached to the columns 22 and 24. At the lower ends of the plates 42 and 44 are attached a third pair of pivot bolts 46 and 48 providing for rotatable connection of a second pair of links 50 and 52. The links 50 and 52 connect to the flow controls of the pair of hydraulic wheel pumps (not shown). Thus, the simultaneous rotation of the columns 22 and 24 above effected by the lever handle 10 movement about the x-axis causes the links 50 and 52 to move in opposite directions and effect a change in flow of one pump relative to the other pump.

Movement over the lever handle 10 about the y-axis, however, causes no rotation of the columns 22 and 24 but does cause simultaneous movement of the links 50 and 52 in the same direction.

Figure 2:
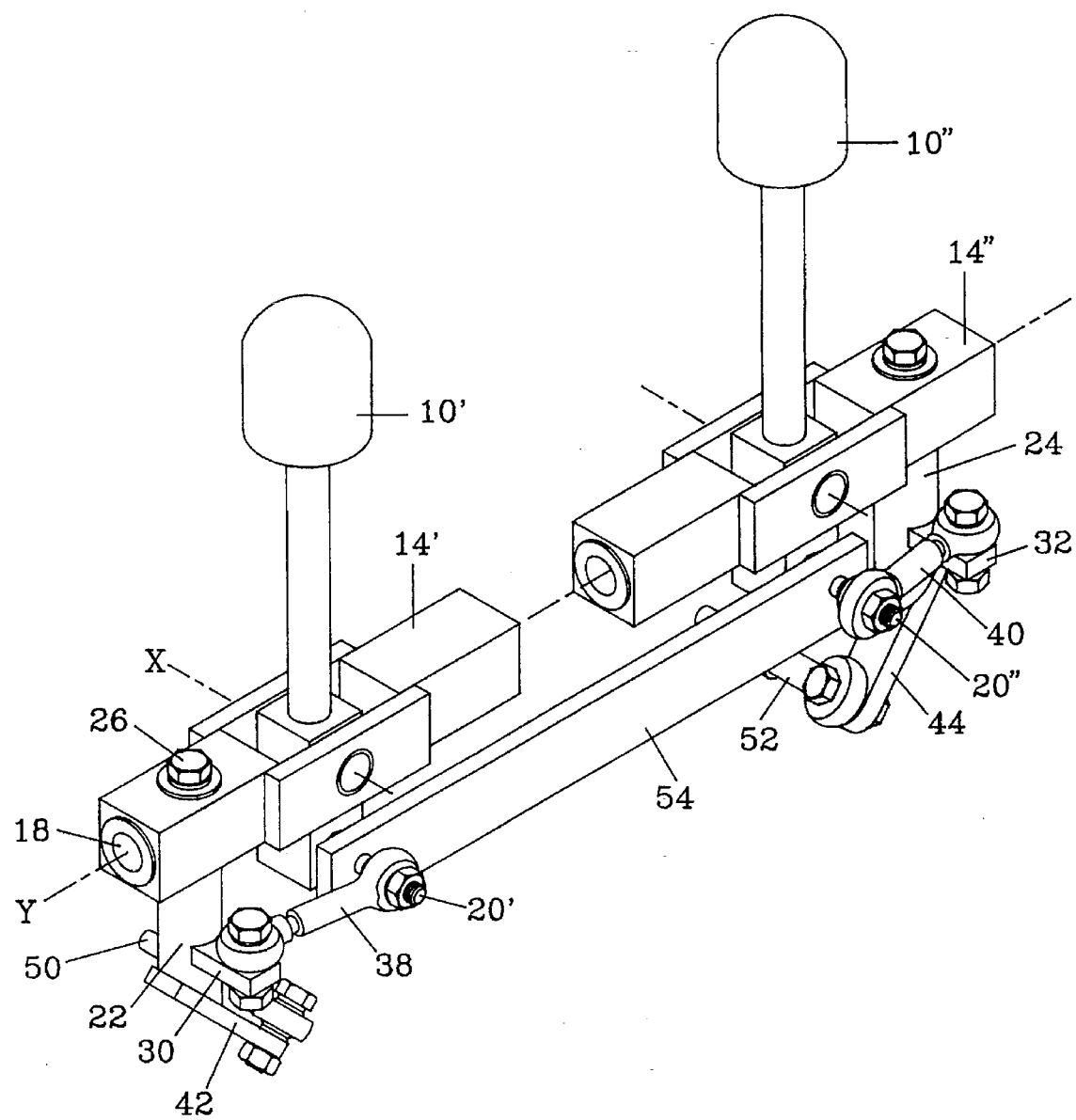
FIG. 2 illustrates in perspective a dual lever handle constrained mower control.

Illustrated in FIG. 2 is a modification that permits two lever handle controls to be linked for operation of the mower by either hand. Elements that correspond to elements in FIG. 1 are numbered the same. The lever handles 10' and 10" are positioned to either side of the operator for operation by either the right hand or the left hand. The only unique additional part needed is a slave bar 54 connecting the stud 20' of lever handle 10' to stud 20" of lever handle 10". With the movement of one lever handle, the other lever handle is constrained to move therewith.

Although described for a mower with a pair of hydraulic wheel pumps, the new lever handle control can be applied to mowers with mechanical clutches from a single engine, electric clutches from a single engine or electric drive wheel motors, for example. The lever handle control can be also applied to non-zero turn radius mowers that use a change in relative rotation of drive wheels to effect steering.

The advantage to the lever handle mechanism is in the constraint to two pivot axes for forward/reverse and steering. Joy stick controls allow free direct motion into and throughout all quadrants of operation. For example, the "upper" or forward and right quadrant of control provides forward motion with a right turn. With the lever handle control the lever handle is pivoted forward to the correct speed, then pivoted right, in the natural manner for operation of a machine (first begin to move forward, then correct course of forward motion). In contrast, the joy stick allows the operator to move the stick on a direct path to a desired speed and turn position, however, the result is some hunting for the correct speed and turn combination.

Tracking the mower straight at high mowing speeds is important. For conventional dual hand and lever control zero-turn-radius mowers, bouncing over the terrain causes inadvertent motion of the levers and erratic steering control. Joy stick control is more difficult since the joy stick can also move easily into any of the four quadrants of joy stick travel. In contrast, with constrained two axes control, the wrist can be locked to control unwanted side to side motions of the lever handle (minor forward and reverse fluctuations are not a problem).

One of the most important features of the new control is the simple means as shown in FIG. 2 above to extend the control for use with either hand of the operator. The new control combines the best of both the single hand control and the choice of operation from either hand. The ability to switch from right hand to left hand at will is useful when operating under over-hanging obstacles or on a steep hillside when the operator is leaning to one side. If continuous control fatigues one hand, then the other or both hands can be used. Also, if one arm or hand is temporarily or permanently disabled, the mower can still be operated.

Figure 3:
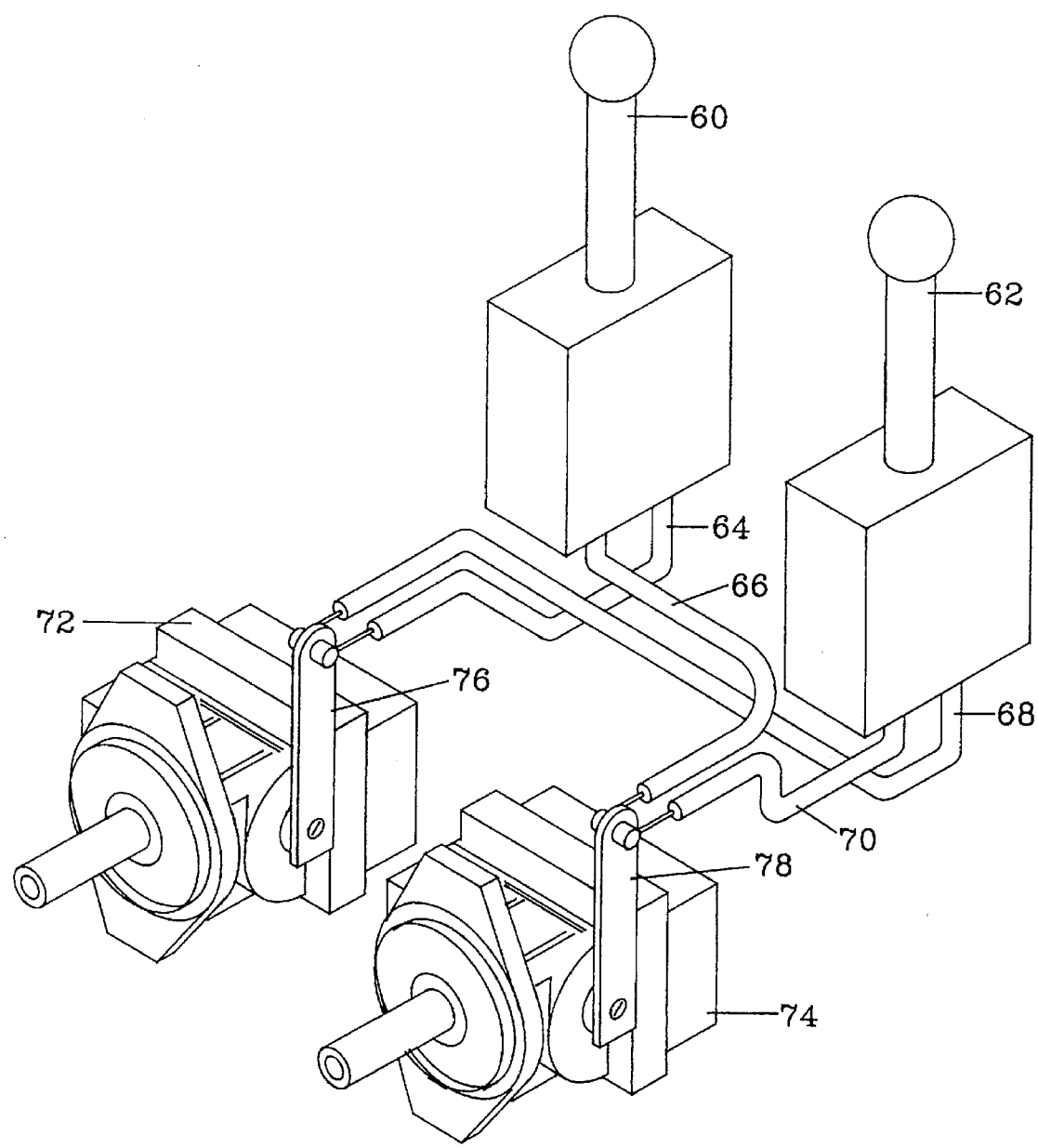
FIG. 3 illustrates in perspective a dual joy stick mower control.

FIG. 3 illustrates a pair of joy sticks 60 and 62 located to either side of the mower operator. Each joy stick 60 and 62 is connected to a pair of wire wrapped cables 64 and 66, and 68 and 70 respectively. The mower is equipped with a pair of hydraulic pumps 72 and 74 or other means for controlling as well as powering the drive wheels of the mower. Each pump 72 and 74 has an operating lever 76 and 78 respectively. Cables 64 and 68 are operably attached to lever 76 and cables 66 and 70 are operably attached to lever 78. Thus, each joy stick 60 or 62 can control both pumps 72 and 74 and therefore the mower forward, reverse, speed and direction can be completely controlled by either joy stick. With this configuration using wire wrapped cables, the unused joy stick is forced to follow the motion of the joy stick moved by the operator. This feature is important because the operator can switch hands and joy sticks quickly under difficult operating conditions such as low tree branches and over hanging hedgerows.

I claim:

1. A speed and direction control for a self-propelled lawn mower comprising a pivot box mounted on the mower for rotation constrained about a first axis, a lever handle rotatably attached to the pivot box, said lever handle constrained to rotate about a second axis, said second axis being non-parallel to the first axis, mower control means linking the speed and direction control to the mower, said mower control means separately connected to the pivot box and the lever handle whereby movement of the lever handle about one of the axes effects forward or reverse movement of the mower and movement about the other of the axes effects steering movement of the mower.

2. The speed and direction control according to claim 1 wherein the lever handle is mounted generally upright on the mower and the first axis lies transverse to the mower whereby motion of the lever handle about the first axis causes forward or reverse movement of the mower.

3. The speed and direction control according to claim 1 wherein the first axis is perpendicular to the second axis and the first axis is transverse to the mower whereby motion of the lever handle about the first axis causes forward or reverse movement of the mower.

4. The speed and direction control according to claim 1 wherein the first axis is perpendicular to the second axis and movement of the lever handle about one of the axes is constrained to forward or reverse motion with movement of the lever handle about the other of the axes constrained to steering movement.

5. The speed and direction control according to claim 1 including a second pivot box mounted on the mower for rotation constrained about a third axis, a second lever handle rotatably attached to the second pivot box, said second lever handle constrained to rotate about a fourth axis, and means interconnecting the lever handle to the second lever handle to cause said second lever handle to move in unison with the lever handle.

6. The speed and direction control according to claim 5 wherein the third axis is parallel to the first axis and the fourth axis is parallel to the second axis.

7. The speed and direction control according to claim 1 wherein the mower control means include a pair of rotatable columns mounted on the pivot box, the axis of rotation of each column being perpendicular to the first axis, means rigidly extending from each column for link attachment and a link attached thereto, the links being attached to the lever handle whereby rotation of the lever handle relative to the pivot box causes the links to rotate the columns about the column axes.

8. The speed and direction control according to claim 7 including a pair of control links attached to the pair of columns, said control links moveable relative to each other upon rotation of the columns about the column axes.

9. The speed and direction control according to claim 1 including a second pivot box mounted on the mower for rotation constrained about a third axis, a second lever handle rotatably attached to the second pivot box, said second lever handle constrained to rotate about a fourth axis, wherein the mower control means include a rotatable column mounted on each pivot box, the axis of rotation of each column being perpendicular to the respective pivot box axis, means rigidly extending from each column for link attachment and a link attached thereto, each link being attached to the respective pivot box lever handle, means interconnecting the lever handle to the second lever handle to cause said second lever handle to move in unison with the lever handle, whereby rotation of either lever handle with the respective pivot box causes the other pivot box to move in unison therewith and rotation of either lever handle relative to the respective pivot box causes the links to rotate the columns about the column axes.

10. A zero turn radius lawn mower comprising a speed and direction control according to claim 1 on the mower, a pair of co-axial drive wheels, a separate drive means for each drive wheel and means to selectably actuate either drive means separately and both drive means simultaneously, wherein the mower control means is linked to the means to selectably actuate the drive means.

11. The zero turn radius lawn mower of claim 10 wherein the lever handle is mounted generally upright on the mower whereby movement of the lever handle about the first axis causes forward or reverse movement of the mower and movement of the lever handle about the second axis causes steering movement of the mower.

12. The zero turn radius lawn mower of claim 11 including a preferred operator location on the mower, a second pivot box mounted on the mower for rotation constrained about a third axis, a second lever handle rotatably attached to the second pivot box, said second lever handle constrained to rotate about a fourth axis and being mounted generally upright on the mower, said lever handle and second lever handle spaced apart and located generally to either side of the preferred operator location, and means interconnecting the lever handle to the second lever handle to cause the second lever handle to move in unison with the lever handle.

13. A zero turn radius lawn mower comprising a pair of co-axial drive wheels, a separate drive means for each drive wheel and means to selectably actuate either drive means separately and both drive means simultaneously, an operator location on the mower and a pair of lever handles located generally on either side of the operator location for movement control of the mower, means connecting the pair of lever handles to the means to actuate the drive means whereby forward or reverse movement of either of the lever handles effects forward or reverse movement of the mower and left or right movement of either of the lever handles effects left or right steering of the mower and means interconnecting the lever handles to cause the lever handles to move in unison.

14. The zero turn radius lawn mower of claim 13 including means constraining the pair of lever handles to pivot about a transverse axis to effect forward or reverse mower movement and means constraining the pair of lever handles to pivot about parallel axes to effect steering movement of the mower.

15. The zero turn radius lawn mower of claim 13 wherein the means interconnecting the lever handles comprises a slave bar attached to both lever handles.

16. The zero turn radius lawn mower of claim 13 wherein the means interconnecting the lever handles comprises wire wrapped cables connecting the lever handles to the means for controlling the mower drive wheels.

17. The zero turn radius lawn mower of claim 16 wherein the lever handles comprise joy sticks.

* * * * *